United States Patent
Peco (10) Patent No.: US 10,801,306 B2
(45) Date of Patent: Oct. 13, 2020

(54) METHOD AND A SYSTEM FOR OPTIMISING ENERGY USAGE AT A DRILLING ARRANGEMENT

(71) Applicant: LKAB WASSARA AB, Huddinge (SE)

(72) Inventor: Thimaq Tim Peco, Solna (SE)

(73) Assignee: LKAB WASSARA AB, Huddinge (SE)

( * ) Notice: Subject to any disclaimer, the term of this patent is extended or adjusted under 35 U.S.C. 154(b) by 155 days.

(21) Appl. No.: 15/766,760

(22) PCT Filed: Sep. 29, 2016

(86) PCT No.: PCT/SE2016/050925
§ 371 (c)(1),
(2) Date: Apr. 6, 2018

(87) PCT Pub. No.: WO2017/061926
PCT Pub. Date: Apr. 13, 2017

(65) Prior Publication Data
US 2018/0283144 A1  Oct. 4, 2018

(30) Foreign Application Priority Data

Oct. 9, 2015 (SE) .................. 1551310

(51) Int. Cl.
*E21B 41/00* (2006.01)
*G05B 13/02* (2006.01)
(Continued)

(52) U.S. Cl.
CPC ........ *E21B 41/0092* (2013.01); *G05B 13/024* (2013.01); *G06F 17/141* (2013.01); *E21B 1/00* (2013.01); *E21B 45/00* (2013.01)

(58) Field of Classification Search
CPC ........ E21B 41/0092; E21B 1/00; E21B 45/00; G05B 13/024; G06F 17/141
See application file for complete search history.

(56) References Cited

U.S. PATENT DOCUMENTS

| 5,864,058 A | 1/1999 | Chen |
| 2004/0049311 A1 | 3/2004 | Kuntze et al. |

(Continued)

FOREIGN PATENT DOCUMENTS

| WO | 2002/19048 A2 | 3/2002 |
| WO | 2004/065749 A2 | 8/2004 |

(Continued)

OTHER PUBLICATIONS

Extended European Search Report (includes Supplementary European Search Report and Search Opinion) received for European Patent Application No. 16853987.2, dated May 23, 2019, 6 pages.

(Continued)

*Primary Examiner* — Taras P Bemko
*Assistant Examiner* — Yanick A Akaragwe
(74) *Attorney, Agent, or Firm* — Morrison and Foerster LLP (57) ABSTRACT

The present invention relates to a method for optimising energy usage at a drilling arrangement. The method includes the step of determining an acceleration of a drilling head in the drilling arrangement. The method further includes determining a parameter related to the energy usage at the drilling arrangement based on the determined acceleration. The method even further includes optimising the energy usage based on the determined parameter. The present invention also relates to a system for optimising energy usage at a drilling arrangement, to a computer program, and to a computer program product.

12 Claims, 3 Drawing Sheets

(51) Int. Cl.
*G06F 17/14* (2006.01)
*E21B 1/00* (2006.01)
*E21B 45/00* (2006.01)

(56) References Cited

U.S. PATENT DOCUMENTS

| | | |
|---|---|---|
| 2008/0156531 A1 | 7/2008 | Boone et al. |
| 2008/0164062 A1 | 7/2008 | Brackin et al. |
| 2013/0245950 A1 | 9/2013 | Jain et al. |
| 2014/0129148 A1 | 5/2014 | Harmer et al. |
| 2015/0105912 A1* | 4/2015 | Dykstra ............ E21B 44/00 700/275 |
| 2015/0107824 A1* | 4/2015 | Signorelli ........ E21B 41/0085 166/244.1 |
| 2015/0112488 A1 | 4/2015 | Hoehn et al. |
| 2016/0069182 A1* | 3/2016 | Neale .................. E21B 47/16 166/254.2 |

FOREIGN PATENT DOCUMENTS

| | | |
|---|---|---|
| WO | 2010/101548 A1 | 9/2010 |
| WO | 2014/165389 A1 | 10/2014 |
| WO | 2017/061926 A1 | 4/2017 |

OTHER PUBLICATIONS

International Preliminary Report on Patentability received for PCT Patent Application No. PCT/SE2016/050925, dated Apr. 19, 2018, 11 pages.

International Search Report and Written Opinion received for PCT Patent Application No. PCT/SE2016/050925, dated Dec. 15, 2016, 14 pages.

* cited by examiner

METHOD AND A SYSTEM FOR OPTIMISING ENERGY USAGE AT A DRILLING ARRANGEMENT

CROSS REFERENCE TO RELATED APPLICATIONS

This application is a U.S. National Phase patent application of PCT/SE2016/050925, filed Sep. 29, 2016, which claims priority to Swedish Patent Application No. SE 1551310-4, filed Oct. 9, 2015, the disclosures of which are incorporated herein by reference in their entirety.

TECHNICAL FIELD

The present invention relates to a method and a system for optimising energy usage at a drilling arrangement. The present invention further relates to a computer program for optimising energy usage at a drilling arrangement and to a computer program product.

BACKGROUND ART

When drilling, a lot of energy is used for the drilling process. It is thus of interest that the energy is used in an efficient way. A way of measuring the energy efficiency is to look at how much rock is destroyed or how much stone is dislodged from the rock for a given amount of energy. Further, one can look at how much energy is needed to remove the dislodged rock out of the drilling hole. If the energy transfer from a drilling arrangement to the rock is too low, the energy might not be enough to dislodge stones from the rock and the energy is mainly transformed into heating of the rock and the drilling arrangement. It might also be that the energy is enough to dislodge stones, but not to remove them from the bore hole. If the energy transfer from the drilling arrangement to the rock is too high, the energy might be transferred into unnecessary kinetic energy of the dislodged stone. The kinetic energy is, for example, unnecessary if the stone is not only pushed out of the bore hole, but has kinetic overshoot energy left after having been pushed out from the bore hole.

When not using the energy efficiently, overshoot energy might also cause damages at the drilling arrangement. Such damages can, for example, be caused by increased wear. This can be due to the overshoot energy being transferred to the drilling arrangement via additional vibrations, heat, and/or strikes.

A common measure used for optimising the energy efficiency is the so-called mechanical specific energy, MSE, which is basically defined as the energy input per unit rock volume drilled. It is thus a task of drilling to decrease the MSE. Then the energy efficiency is increased.

Although being a useful parameter, the MSE has the drawback that it is not easy to determine. A lot of different sensors are needed at the drilling arrangement for giving input to a calculation of the MSE. This results in increased complexity of the drilling arrangement.

Another drawback of the MSE is that the different sensors relate to different parameters which all can be optimised. The parameters are, however, not independent of each other. Thus, when optimising one parameter, another parameter can be worsened. Common control algorithms for optimising the parameters so that the MSE is reduced are often outperformed by experienced drilling operators who have the right "feeling" about how a specific drilling arrangement behaves under certain conditions.

There is thus a need for a less complex way of optimising the energy usage at a drilling arrangement.

There is thus also a need for making it easier to optimise energy usage at a drilling arrangement for an operator or a control algorithm.

SUMMARY OF THE INVENTION

It is an objective of the present invention to present an advantageous method, system, computer program, and computer program product for optimising energy usage at a drilling arrangement.

It is an objective of the present invention to present a simpler method, system, computer program, and computer program product for optimising energy usage at a drilling arrangement.

It is an objective of the present invention to present an alternative method, system, computer program, and computer program product for optimising energy usage at a drilling arrangement.

At least one of the objectives is achieved by a method for optimising energy usage at a drilling arrangement. The method comprises the step of determining an acceleration of a drilling head in the drilling arrangement. The method further comprises determining a parameter related to the energy usage at the drilling arrangement based on the determined acceleration. The method even further comprises optimising the energy usage based on the determined parameter.

Such a method has the effect that only one input parameter, i.e. the acceleration, is needed for determining a parameter relating to the energy usage at the drilling arrangement. Thus there is low complexity in the system. Further, it will be easy to optimise energy usage since only one parameter has to be observed when optimising. An operator thus can get immediately feedback regarding the energy usage of any action which has been performed on the drilling arrangement.

In one example, the method further comprises the step of determining a main drilling frequency based on the determined acceleration. The determining of the parameter related to the energy usage can then be based on the determined main drilling frequency. The main drilling frequency has great influence on the energy usage. It is thus advantageous to determine it.

In one example, the method further comprises the step of using a cepstrum method for determining the main drilling frequency. This ensures that an overtone with a higher amplitude is not mistakenly identified as the main drilling frequency.

In one example, the method further comprises the step of integrating said main drilling frequency over time. This results in the number of strikes per time unit. It has turned out that the number of strikes per time unit relates to the depth drilled. Determining the main drilling frequency over time thus also gives information regarding the depth of a bore hole. The determining of the parameter related to the energy usage can then be based on the integrated main drilling frequency In one example, the method further comprises the step of determining the frequency of at least one of the overtones of the main drilling frequency based on the determined acceleration. Preferably not so much energy should be transferred to the overtones. Determining the frequency/frequencies of them does thus lead to a way of determining energy distribution in the overtones.

In one example the method further comprises the step of determining the amplitude of the acceleration at the main drilling frequency and preferably the amplitude of the acceleration at said at least one of its overtones frequencies. The amplitude relates to the energy placed in the respective modes. Determining the amplitude/-s thus gives a hint of the energy in these modes. The determining of the parameter related to the energy usage can then be based on the determined amplitudes of the acceleration at the main drilling frequency and preferably of said at least one of its overtones.

In one example, the method further comprises the step of integrating said amplitude of the acceleration at the main drilling frequency and said at least one of its overtones over time.

In one example the method further comprises the step of performing a Fourier transform of the determined acceleration of the drilling head. Performing a Fourier transform, especially a fast Fourier transform, is relatively easy to perform and allows the determination of one or several quantities relating to the energy usage at the drilling arrangement. Such quantities can be said frequencies and/or said amplitudes.

In one example, the acceleration of the drilling head is determined at least in the drilling direction. This is an especially useful direction for using the results in this direction for the optimisation of the energy.

In one example the method further comprises the step of presenting said determined parameter to an operator of the drilling arrangement. This allows the operator to monitor the energy usage. It further allows the operator to perform measures in case an operation of the energy usage is needed.

In one example, the method is applied while drilling. This allows immediate actions on the drilling process. Especially no additional dead time has to be spent for analysing purposes.

At least one of the objectives is achieved by a system for optimising energy usage at a drilling arrangement. The system comprises sensing means, which are arranged for determining an acceleration of a drilling head in the drilling arrangement. The system further comprises determining means, which are arranged to determine a parameter related to the energy usage at the drilling arrangement based on the determined acceleration so that this determined parameter can be used for optimising energy usage at the drilling arrangement.

In one embodiment, the system comprises means for determining a main drilling frequency based on the determined acceleration.

In one embodiment, the system comprises means for optimising the energy usage at the drilling arrangement.

In one embodiment, the system comprises presenting means, which are arranged for presenting said determined parameter to an operator of the drilling arrangement.

At least one of the objectives is achieved by a computer program for optimising energy usage at a drilling arrangement, wherein said computer program comprises program code for causing a control unit to perform the steps according to the method of the present disclosure.

At least one of the objectives is achieved by a computer program product containing a program code stored on a computer-readable medium for performing method steps according to the method of the present disclosure, when said computer program is run on an electronic control unit. The computer readable medium is in one example a non-volatile medium.

The system, computer program, and computer program product has advantages corresponding to the advantages of the corresponding method.

Further advantages of the present invention are described in the following detailed description and/or will arise to a person skilled in the art when performing the invention.

DETAILED DESCRIPTION

Figure 1A:
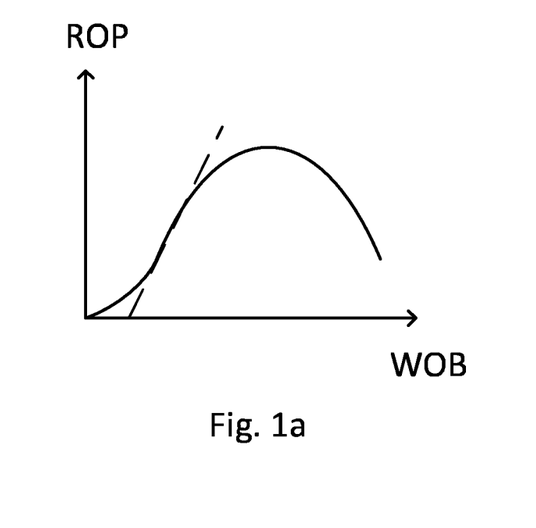
FIG. 1a depicts schematically a possible behaviour of a drilling arrangement when drilling.

In FIG. 1a a possible behaviour between the so-called weight on bit, WOB, i.e. the amount of downward force placed on a bit, and the so-called rate of penetration, ROP, i.e. the speed at which the bit drills into a formation, is schematically shown. With low WOB the downward force might not be enough to cut the formation efficiently. The term formation can relate to rock, stone, or any other material in which the drilling operation should be performed.

After a certain ramping-up period, an increased WOB will increase the ROP approximately linear as is indicated by the dashed line in the FIG. 1a. For increasing the ROP one can thus increase the WOB. Above a certain amount of WOB, however, the ROP will increase with lower and lower slopes. Above another certain amount of WOB, the ROP will eventually decrease. The lowering of the slope and the eventual decrease can be caused by a balling of a drill bit, by a balling of a bottom hole assembly, BHA, by vibrations, by a reduced hammer strike length, or due to other reasons. The certain amounts referred to above are highly dependent on the formation, the drill arrangement, and/or on other parameters. Thus no general formula can be given regarding the optimal value for the WOB. Also the maximum available value for the ROP and the range of linear increase of the ROP depend highly on the formation, the drill arrangement, and/or on other parameters. Thus no general formula can be given regarding the optimal value for the ROP.

FIG. 1a is only an example for one combination of formation and drill arrangement. Other combinations of formations and/or drill arrangements can show different behaviours.

Figure 1B:
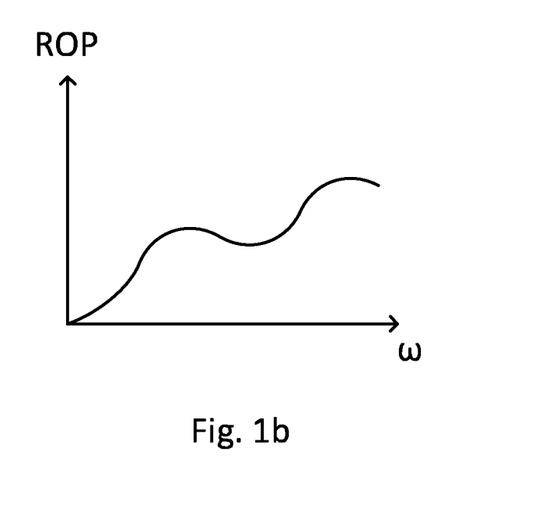
FIG. 1b depicts schematically a possible behaviour of a drilling arrangement when drilling.

In FIG. 1b a possible behaviour between the ROP and the rotation speed $\omega$ of the drill bit is schematically plotted. In this example the ROP is first increased with increasing $\omega$. Above a certain first $\omega$, however, the increasing rate of the ROP gets lower. Above a certain second $\omega$ even the ROP gets lower, until a certain third $\omega$. Above the third $\omega$ the ROP is increasing again, and this behaviour can continue for several such cycles as indicated in the figure. The reason for that behaviour can be anyone, or a combination, of the following: With higher ω energy can be transferred into vibrational modes of the drill arrangement. Such vibrational modes can be in the axial direction, in lateral directions, or can be torsional vibrations. Thus the drill bit might have higher frequencies than the drilling frequency, might not rotate around its centre position, or might slip due to too much torque applied. Other reasons can be due to the symmetry of the drill bit. When looking at the axial direction, the drill bit has usually some extruding parts which first come into contact with the formation during drilling. These extruding parts are usually arranged around the centre axel of the drilling arrangement with some kind of symmetry. During drilling the ROP might depend on whether the extruding parts hit the same part of the formation, seen in the axial direction, or another part of the formation, seen in the axial direction, when hitting the formation the next time. This can explain the periodicity of the behaviour in FIG. 1b.

As in FIG. 1a, the behaviour in FIG. 1b is only an example which might occur at a specific formation and a specific drilling arrangement. Other formations and/or drilling arrangements might show other behaviours.

Figure 2:
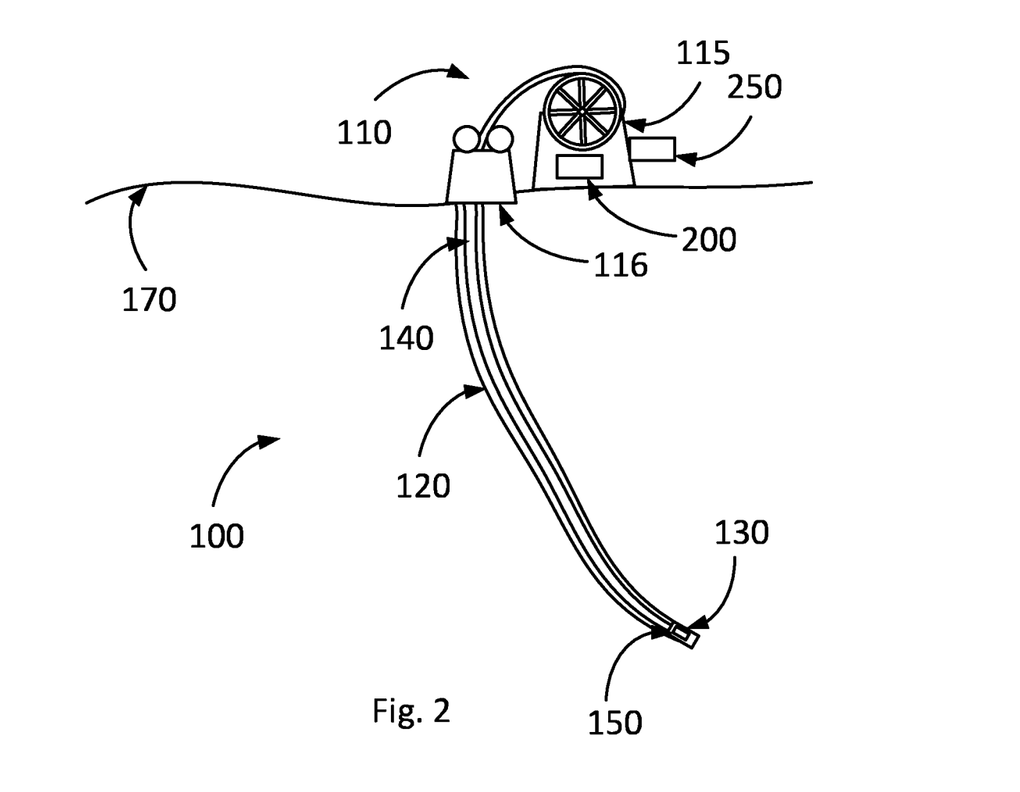
FIG. 2 depicts a schematic sketch over a drilling arrangement.

FIG. 2 depicts a schematic sketch over a drilling arrangement 100. It should be emphasized that the shown example is not to scale. In FIG. 1 a soil 170 is shown. The drilling arrangement 100 is shown for drilling of a drilling hole 120. The drilling hole can, for example, be a bore hole or a wellbore. In one example, the drilling arrangement 100 is a coiled tubing, CT, drilling arrangement. The drilling arrangement is preferably a hammering, or percussive drilling arrangement. In one example, the drilling arrangement 100 uses drill rods. The drilling arrangement 100 may comprise a drill string 140. The drill string 140 may comprise a tube. The drill string may comprise drill rods. One part of the drill string 140 can be in the drilling hole 120 and another part of the drill string 140 can be outside the drilling hole 120. At one end of the drill string 140 there is arranged a bottom hole assembly, BHA, 130. The drilling arrangement 100 also comprises a drill rig arrangement 110. The drill rig arrangement 110 is usually outside the drilling hole 120. The drill rig arrangement 110 comprises CT drum 115. The CT drum 115 is arranged to carry the part of the drill string 140 which is outside the drilling hole 120. The drill rig arrangement 110 also comprises an injection arrangement 116. The injection arrangement 116 is arranged to inject the drill string 140 into the drilling hole 120.

In one embodiment the drill rig arrangement 110 is put on a carrier (not shown). Such a carrier can then comprise the injection arrangement 116 and the CT drum 115. The carrier can also comprise electricity and water supply. The carrier can further comprise a drill boom and/or guiding arches. In one example the carrier is a vehicle.

In another embodiment the drill rig arrangement 110 is an oil tower or a derrick. In principle, the drill rig arrangement 110 can be any kind of suitable drill rig arrangement. The present disclosure is also especially useful for wellbores or bore holes. The present disclosure can, however, also be used for any other kind of holes. Consequently, the drill rig arrangement 110 can be any arrangement which can be used to achieve a wellbore, a bore hole or any other kind of hole.

The present invention is especially useful to use in relation to drilling arrangement 100 while drilling.

In the shown example the drilling hole 120 is drilled downwards. A drilling hole, a drilled hole or any other kind of hole can, however, equally well be drilled, have been drilled or extend upwards. In one example, the present disclosure is thus used for upward drilling, or for upward drilled holes. These upward holes exist for example in mining industry. As an example, one can drill upward from a mining gallery. It is also possible to use the present disclosure for any other direction than upwards or downwards.

A drilling arrangement according to prior art could comprise a system for determining the mechanical specific energy, MSE (not shown in FIG. 2). MSE is usually defined as $$MSE = \frac{WOB}{BA} + \frac{120\pi\omega \cdot T}{BA \cdot ROP}.$$

There, the first term can relate to rock dislocation and the second term to removal of failed rock. BA denotes the bit area, and T the torque applied to the drill bit. The drill bit is usually comprised in the BHA 130. The BA is defined as the cross-sectional area of the drill bit in the drilling direction.

For determining the MSE often four sensor arrangements are used. A first sensor arrangement can be arranged for measuring ω. A second sensor arrangement can be arranged for measuring ROP. A third sensor arrangement can be arranged for measuring WOB. A fourth sensor arrangement can be arranged for measuring T. In principle the sensor arrangements could be place at or close to the BHA 130. In practice, however, the sensor arrangements are often placed close to or at the drill rig arrangement 110. Some of the reasons are that the sensor arrangements are exposed to a less harsh environment close to the drill rig arrangement, that they are easier to replace there, and that they can communicate their results easier to a control unit or a displaying unit when not in the drilling hole 120. The disadvantage is, however, that the values measured at the drill rig arrangement 110 do not coincide with the real conditions at the BHA 130. As an example, the drill bit in the BHA 130 can get stuck at the rock. Thus more torque will be built up at the drill bit before it actually releases from its stuck position. Such a stuck will, however, not immediately be visible when measuring T at the drill arrangement 110 since the drill string 140 at its upper end will continue turning around and is not getting immediately stuck.

Although it will become clear soon that none of the above named first to fourth sensor arrangements are necessary for performing the present invention, it should be clear that these sensors of course still might be present at the drilling arrangement 100 for other reasons.

In the present disclosure, sensing means 150 for determining an acceleration of a drilling head in the drilling arrangement 100 are arranged at the drilling arrangement 100. The sensing means 150 comprises for example an accelerometer. In the shown example, the sensing means 150 is placed in the BHA 130. The sensing means 150 can, however, easily will be arranged at other parts of the drilling arrangement 100. Examples of other places for arrangement are the drill string 140 or a rotary unit (not shown in the figure) for the drill string 140. Such a rotary unit is often placed outside the drilling hole 120. The acceleration of the drilling head is usually transferred through the drill string 140 so that it is not necessary to place the sensing means 150 at the BHA 130. In principle, the sensing means 150 could also be placed after a rotary unit or after the drill rig arrangement 110. In that case, however, the acceleration from the drilling head is usually damped before reaching the sensing means 150. One would thus have to take into account a transfer function of the parts of the drilling arrangement being arranged in between the sensing means 150 and the drilling head.

When designing a system for optimising energy usage at the drilling arrangement one has thus some freedom in choosing a position for the sensing means 150. When placing close to the BHA 130, the sensing means can give fast response and very accurate values. The drawbacks are that it will be time consuming replacing a defect sensing means 150 and that a sampling rate of the sensing means 150 might be limited due to constraints of how much data can be transferred from the BHA 130 to a control unit 200 of the drilling arrangement.

Placing the sensing means 150 close to the rotary unit has the advantage of being far easier to replace when defect and usually allowing a higher sampling rate. Drawbacks might be a slightly delayed response from the BHA 130 and a slightly filtered response from the BHA 130. In practice, theses drawbacks have turned out not to be too strong so that an achieved result still can be used in an advantageous way to perform the invention. Examples of fastening the sensing means are screwing, gluing, or welding. Another example of fastening the sensing means is via magnets, such as neodymium magnets.

The control unit 200 can in principle be placed at any suitable place at the drilling arrangement 100. In principle, the control unit 200 can also be placed outside the drilling arrangement 100. The sensing means 150 are arranged to transmit signals to the control unit 200. Preferably, signals relating to the acceleration of the drilling head are transferred from the sensing means 130 to the control unit 200. The transfer takes place for example via wireless or wired communication. The control unit 200 is arranged to receive and to process the signals relating to the acceleration of the drilling head. In one example the control unit 200 and the sensing means 150 are at the same place or even the same component.

The sensing means 150 are arranged to determine the acceleration of the drilling head at least in the drilling direction. For this purpose, the sensing means 150 might comprise an accelerometer. The accelerometer may be oriented in the drilling direction. When the accelerometer is not oriented in the drilling direction, a measured acceleration of the sensing means may be projected onto the drilling direction. In one example, the determined acceleration is in one direction. In one example, the determined acceleration is in three dimensions.

The sensing means 150 might comprise a pressure sensor. The pressure sensor can be a water column pressure sensor. The pressure sensor can be arranged to sense vibrations of a water column. In case another liquid fluid is used for drilling, the sensor can easily be adapted to that other fluid instead of water. Since liquid fluids in general are basically incompressible and since the drilling head in general is in contact with the fluid, the acceleration of the drilling head transfers to the fluid and can thus be sensed on the fluid.

In one example, the sensing means 150 comprise both a pressure sensor and an accelerometer. Thus, a more reliable result can be obtained.

The control unit 200 is arranged to determine a parameter related to the energy usage at the drilling arrangement 100 based on the determined acceleration. The determined parameter is used for optimising energy usage at the drilling arrangement. A more detailed description will be given in relation to FIG. 3-5. The control unit 200 can be arranged to perform any of the other actions described in relation to FIG. 3-5.

The drilling arrangement 100 comprises in the illustrated example presenting means 250. The presenting means 250 are arranged for presenting the determined parameter to an operator of the drilling arrangement. The presenting means 250 can comprise any of a screen, a display, a voice output arrangement, or the like.

Figure 3A:
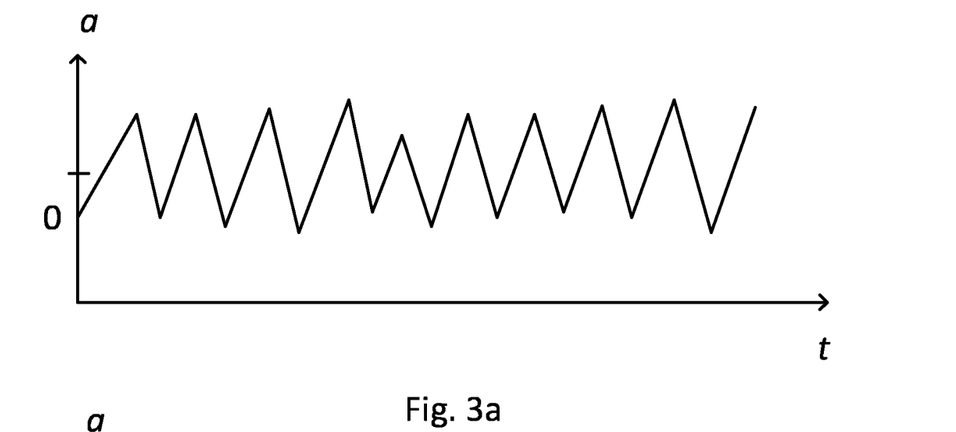
FIG. 3a depicts schematically a signal which might arise in relation to the present invention.
Figure 3B:
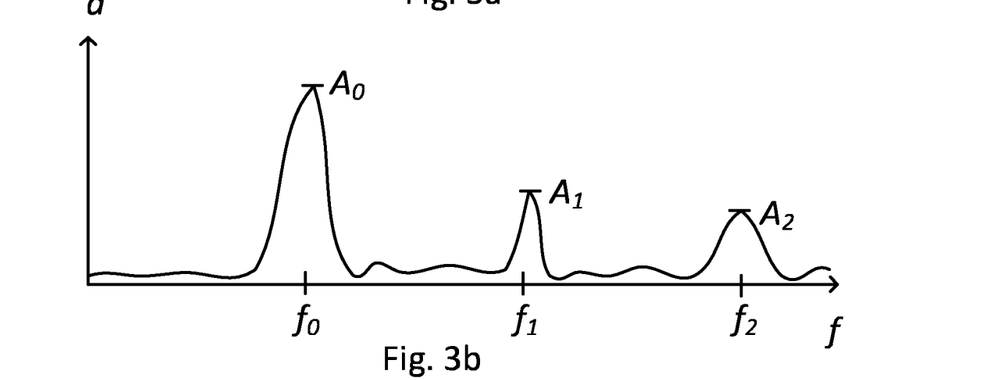
FIG. 3b depicts schematically a relation which might arise in relation to the present invention.
Figure 4A:
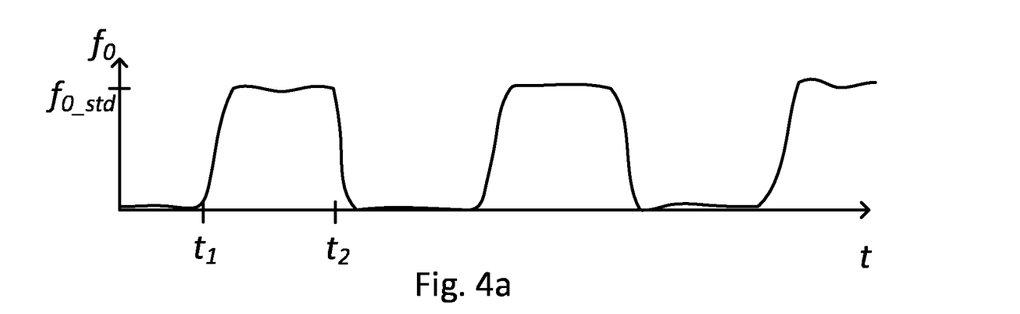
FIG. 4a depicts schematically a relation which might arise in relation to the present invention.
Figure 4B:
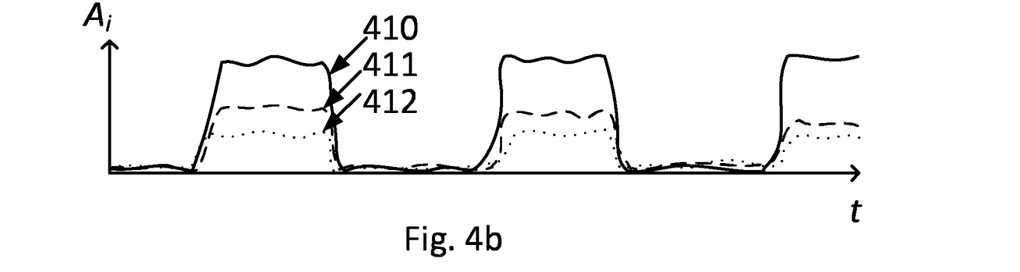
FIG. 4b depicts schematically a relation which might arise in relation to the present invention.
Figure 5:
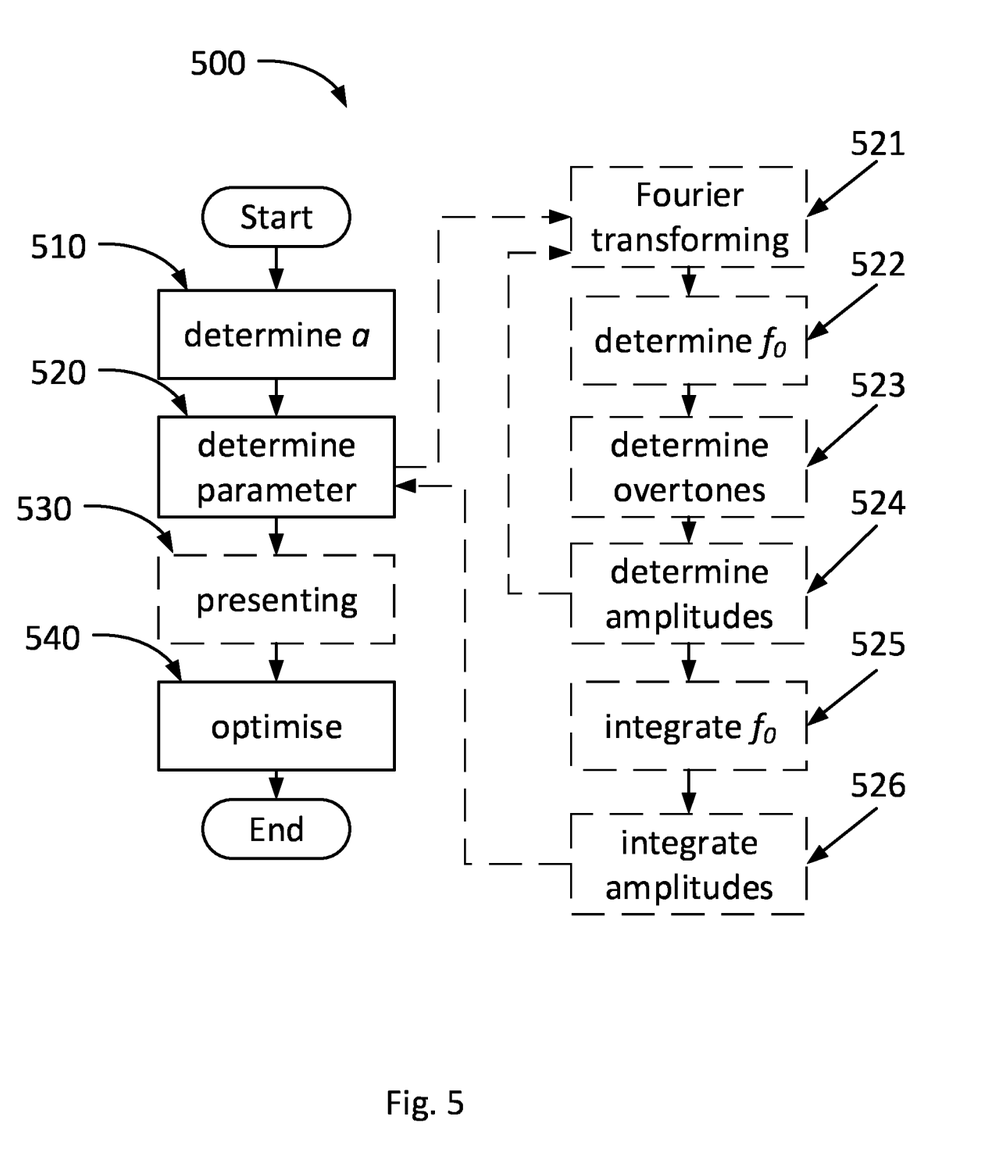
FIG. 5 shows a flowchart of an example of a method according to the present invention.

In the following, a method 500 for optimising energy usage at a drilling arrangement is described in relation to FIG. 3-5. FIG. 5 shows a schematic flowchart with the steps of such a method 500. FIG. 3-4 show schematically sketches of examples of curves in relation to the steps of method 500. It should be stressed that these curves are no real measurement values but only shown to clarify the principle of the invention. They are thus especially not necessarily in the right scale as real measurement results will be. It should especially be noted that the plotted time axis in FIG. 3a is in general showing a substantially shorter time period than the time axis in FIG. 4a and FIG. 4b. The differences between the time scales in these Figures can in practice be several orders of magnitude. It should also be noted that the noise of real time measurements might completely differ from the noise in FIG. 3-4. The method 500 is preferably performed while drilling.

The method 500 starts with a step 510. In step 510 an acceleration of a drilling head in the drilling arrangement is determined. The sensing means 150 may determine the acceleration of the drilling head. Especially an accelerometer comprised in the sensing means may determine the acceleration of the drilling head. The determination can comprise measuring the acceleration. The determination can comprise sensing vibrations of a water column. The acceleration of the drilling head is preferably determined at least in the drilling direction. In one example this is achieved by orienting the sensing means in the drilling direction. In one example this is achieved by projecting the determined acceleration in the drilling direction. An example of how such a determined acceleration can look like is depicted in FIG. 3a where the acceleration a is plotted over time. The plotted acceleration can be the acceleration in the drilling direction. As can be seen, the acceleration varies between positive and negative values. This is due to the hammering of the drill bit. In principle, the hammering can be at any frequency. In a practical example, the drilling bit hits the rock around 50 times per second. For such an example, the time period plotted in FIG. 3a would be around 200 milliseconds. In FIG. 3a the pattern is a zigzag pattern. The pattern can, however, take any other form as well. Another example of a pattern is a sinusoidal pattern. The pattern might further contain overtones and noise. The determining of the acceleration of the drilling head can be done continuously or intermittently. After step 510 a step 520 is performed.

In step 520 a parameter related to the energy usage at the drilling arrangement is determined based on the determined acceleration. This parameter can be the parameter W which will be described in the following and which will be denoted as waste parameter throughout this disclosure. It has turned out that the parameter W behaves similar like MSE. As an example, if MSE is lowered, usually W is lowered as well. The waste parameter is in a specific example defined as $$W = \frac{\int f_0 dt}{\sum_{i=0}^{n} \int A_i dt},$$

wherein n denotes a natural number equal to zero, or preferably greater than zero, dt denotes integration over time, $f_0$ denotes a main frequency of the determined acceleration, and $A_i$ denotes the amplitude of the i:th overtone of the determined acceleration as will be described in more detail later on. It should be noted that there are different possibilities to define W. In one example, some weighting factors are included in the determination of W. In one example, additional parameters are included in the determination of W.

Step 520 can comprise any of the substeps 521-526.

In step 521 a Fourier transform, FT, of the determined acceleration of the drilling head is performed. Preferably the Fourier transform is a so-called fast Fourier transform, FFT. The FT is preferably performed so that at least one of the main drilling frequency of the drilling head, the overtones, and the amplitudes of the main frequency and/or the overtones can be determined. In one example, the FT is performed so that the amplitude a is determined depending on the frequency f. An example of the result of a FT is shown schematically in FIG. 3b. There, the acceleration a is depicted as a function of the frequency f. As can be seen, a main frequency $f_0$ is present in the spectrum of the acceleration. The main frequency can be the fundamental hammer frequency of the drill head. A first overtone frequency $f_1$ and a second overtone frequency $f_2$ is present in the spectrum of the acceleration as well. As an example, the main frequency could be 50 Hz, the first overtone frequency 100 Hz, and the second overtone frequency 150 Hz. When performing step 521, a suitable time period for the acceleration is chosen. This is in one example one second. The determined acceleration signal during one second is then, in one example, fast Fourier transformed for achieving a curve as in FIG. 3b. In FIG. 3b the amplitude of the main frequency is higher than the amplitude of the first overtone frequency. In FIG. 3b the amplitude of the first overtone frequency is higher than the amplitude of the second overtone frequency. In practice, more than two overtones can often be seen. A reasonable sampling rate has to be chosen to find the right amount of overtones. For that the Nyquist rate has to be taken into account as is known in the art. In general, the more overtones can be detected, the better. This is due to the fact that inputted energy into the drilling arrangement 100 can, in principle, be in any of the overtones. In one example, at least 2, 3, 4, 5, 7 or 10 overtones are taken into account.

The amplitudes in FIG. 3b can be in meter per second squared, or in units of the Earth gravity g. As an example, the main frequency could have an amplitude of 6 g. As can be seen in FIG. 3b, the main frequency and its overtones are not necessarily sharp peaks but could be smeared out. After step 521, a step 522 is performed.

In step 522 the main drilling frequency is determined based on the determined acceleration. The main drilling frequency is the main drilling frequency of the drilling head. The main drilling frequency relates to the main drilling frequency in the drilling direction. As an example, in case the drilling arrangement is a hammering drilling arrangement, the main drilling frequency relates to the main drilling frequency of the hammering. In practice, the situation is often not as clear as indicated in FIG. 3b. Instead the spectrum can have a much higher level of noise, so that it might be difficult to find $f_0$. Further, it might happen that the amplitude of one of the overtones is higher than the amplitude of $f_0$. Special attention has thus to be given not to identify one of the overtones as $f_0$. This is in one example solved via a step of taking a logarithm of the spectrum shown in FIG. 3b. It can further comprise making an inverse Fourier transform of the logarithmised spectrum. In one example, this is solved by using the so-called cepstrum method which is known in the art from, for example, speech recognition. After step 522, a step 523 is performed.

In step 523 the frequency of at least one of the overtones of the main drilling frequency is determined based on the determined acceleration. In one example the frequency of the first overtone is determined. In one example the frequency of the second overtone is determined. In one example, the frequency of the first two, three, four, five, seven, or ten overtones are determined. This can also be done with the help of the so-called cepstrum method. After step 523, a step 524 is performed.

In step 524 the amplitude $A_0$ of the acceleration at the main drilling frequency is determined. Further, in case overtone frequencies have been determined in step 523, the amplitude $A_1, A_2, \ldots, A_n$ of the acceleration at said at least one of the overtone frequencies is determined. In the example of FIG. 3b the amplitude $A_0$ is higher than the amplitude $A_1$. Om the example of FIG. 3b the amplitude $A_1$ is higher than the amplitude $A_2$. It might, however, be that the amplitude of an overtone is higher than the amplitude of the main frequency, and/or that the amplitude of a higher overtone is higher than the amplitude of the lower overtone. After step 524, step 525 is performed.

In step 525, the main drilling frequency is integrated over time. A schematic example can be seen in FIG. 4a, where the main drilling frequency is plotted as a function of time. One has to understand that what is shown in FIG. 3b and performed in the previous steps is preferably repeatedly done. In other words, the FT as described in relation to step 521 is performed for a new time period again, for example for another period of one second. These time periods do overlap in one example. In other words, the next time period does in this example not start when the first time period ends, but starts already during the first time period. In one example, when a FFT is used, theses FFT can thus have an overlapping kernel. As an example, if the first time period is one second, the next time period of one second for the FT can overlap with half a second with the first time period. Then $f_0$ and possibly at least one of its overtones can be determined repeatedly. This repeatedly determined $f_0$ is plotted in FIG. 4a as a function of time. It should be understood that the plotted time period in FIG. 4a can be orders of magnitudes bigger than the time period in FIG. 3a.

In the shown example, $f_0$ is basically varying between basically zero and another value, $f_{0\_std}$, being very distinct from zero. This other value is in one example around 50 Hz. This can be understood as follows. Before a first point in time $t_1$ no drilling is performed, thus $f_0$ is basically zero. At the first point in time $t_1$ drilling starts. It will take some time before the main drilling frequency will have reached its ordinary value, i.e. some ramping up in $f_0$ might occur. The main drilling frequency might then fluctuate slightly around $f_{0\_std}$. At a second point in time $t_2$ the drilling stops. This might, for example, be caused by the fact that another drill rod has to be added to the drill string 140. In one example this might be caused by some service work. Then the main drilling frequency will drop to basically zero. Some ramping down might occur. After some additional time, for example after adding a drilling rod to the drill string 140, or after performing service, the drilling can continue and the main drilling frequency might again be around $f_{0\_std}$. In the shown example, only one value $f_{0\_std}$ is present. The main drilling frequency while drilling can, however, in one example vary more than indicated in FIG. 4a. When referring to integrating over time, a suitable time period should be chosen. That suitable time period is usually much shorter than the difference between $t_1$ and $t_2$. A suitable time period for integration can, for example, be one, two, three, five, or ten seconds. In general, a suitable time period for integration can be a time period similar to the time period used for one FT. After step 525, a step 526 is performed.

In step 526 the amplitude $A_o$ of the acceleration at the main drilling frequency is integrated over time. In one example, the amplitudes $A_1, A_2, \ldots, A_n$ of the acceleration at said at least one of the overtone frequencies is integrated over time. What has been described in step 525 relating to FIG. 4a relates in a corresponding way to FIG. 4b. In FIG. 4b the amplitudes from FIG. 3b are schematically plotted over time. For that, as previously described, several FT are performed for arriving at several relations as in FIG. 3b. The amplitudes are then determined in these FT. They can then be plotted as indicated in FIG. 4b. Here, curve 410, i.e. the solid line, denotes the curve of $A_0$. Curve 411, i.e. the dashed line, denotes the curve of $A_1$. Curve 412, i.e. the dotted line, denotes the curve of $A_2$. As indicated, $A_0$ does not always have to have the highest amplitude. The situation is similar as in FIG. 4a. For example, the amplitudes can differ between a lower value which is basically zero, and a higher value different from zero. The reasons for the amplitudes being basically zero are the same as described before, for example adding a drill rod. What has said before regarding the time period of integration in step 525 applies here as well. Preferably, the time periods of integration in step 525 and in step 526 are equal.

The waste parameter W can be determined based on some or all of the substeps 521-526. In one example, the waste parameter W is the parameter explicitly defined on page 11. The parameter related to the energy usage at the drilling arrangement is in one example determined based on the determined main drilling frequency. The parameter related to the energy usage at the drilling arrangement is in one example determined based on the integrated main drilling frequency over time. The parameter related to the energy usage at the drilling arrangement is in one example determined based on the determined frequency of at least one of the overtones of the main drilling frequency. The parameter related to the energy usage at the drilling arrangement is in one example determined based on the determined amplitude of the acceleration at the main drilling frequency and said at least one of its overtones. The parameter related to the energy usage at the drilling arrangement is in one example determined based on the integrated amplitude of the acceleration at the main drilling frequency and said at least one of its overtones over time. After step 520, an optional step 530 is performed.

In the optional step 530, the determined parameter is presented to an operator of the drilling arrangement. This might be done via the presenting means 250. The operator can thus monitor the determined parameter. The presenting can be visually and/or acoustically. After the optional step 530, a step 540 is performed.

In step 540 the energy usage is optimised based on the determined parameter. This optimisation is in one example performed manually. In one example the optimisation is performed automatically. The optimisation is in one example performed by the control unit 200. Such an optimisation is in one example lowering the waste parameter W. In another example, the optimisation comprises maximising a parameter. As an example, a parameter 1/W could be defined. The optimisation can comprise changing any of WOB, ω, T, hydraulic pressure, and/or ROP.

It will be enough to focus on one parameter, for example W, when optimising. This parameter will then give direct feedback whether a certain action has resulted in an optimised energy usage or not.

The optimising of the energy usage can comprise changing at least one rig parameter. In one example, said changing of the at least one rig parameter is performed so as to reduce energy wastage. Said at least one rig parameters are, for example, a water/fluid pressure, the WOB, and/or ω. When referring to optimising the energy usage based on the determined parameter, it should be understood that this in practice often relates to a minimising or a maximising of the value of said determined parameter. Whether a minimising or a maximising should be performed depends on the exact definition of said parameter. In this respect maximising a parameter is equal to minimising the reciprocal of that parameter, or vice versa.

After step 540 the method ends. It should be noted that the steps which are drawn with dashed lines in FIG. 5 are optional. The order of the steps is not restricted to the order presented here. Instead, some or all of the steps could be performed in different orders or in parallel.

Although being described on basis of specific examples or embodiments, the present disclosure is not limited to these examples and embodiments. A person skilled in the art will with the help of the description find other ways of how to use the present disclosure within the scope of the claims. A person skilled in the art will especially be able to combine different examples or embodiments to adapt the invention to specific situations, or to find other examples of how to apply the present disclosure within the framework of the claims.

The invention claimed is:

1. A method for optimising energy usage at a hammering drilling arrangement, the method comprising the steps:
    a) determining an acceleration of a drilling head in the drilling arrangement at least in the drilling direction;
    b) determining a main drilling frequency in the drilling direction based on the determined acceleration;
    c) integrating said main drilling frequency over time;
    d) determining an amplitude of the acceleration at least at the main drilling frequency;
    e) determining a parameter related to the energy usage at the drilling arrangement based on said integration and said determined amplitude of the acceleration at least at the main drilling frequency; and
    f) optimising the energy usage based on an optimisation of the value of the determined parameter.

2. The method according to claim 1, further comprising the step of integrating said amplitude of the acceleration at the main drilling frequency over time, and wherein said parameter is based on said integration.

3. The method according to claim 2, further comprising the step of determining the frequency of at least one of the overtones of the main drilling frequency based on the determined acceleration, and wherein said parameter is based on said determined frequency of at least one of the overtones.

4. The method according to claim 3, further comprising the step of determining the amplitude of the acceleration at said at least one of its overtones, and wherein said parameter is based on said determined amplitude of the acceleration at said at least one of its overtones.

5. The method according to claim 3, further comprising the step of integrating said amplitude of the acceleration at said at least one of its overtones over time, and wherein said parameter is based on said integration.

6. The method according to claim 1, further comprising the step of performing a Fourier transform of the determined acceleration of the drilling head, and wherein said parameter is based on said Fourier transform.

7. The method according to claim 1, further comprising the step of presenting said determined parameter to an operator of the drilling arrangement.

8. The method according to claim 1, applied while drilling.

9. A computer program for optimising energy usage at a hammering drilling arrangement, wherein said computer program comprises program code for causing a control unit to perform the steps according to claim 1.

10. A computer program product containing a program code stored on a computer-readable medium for performing method steps according to claim 1, when said computer program is run on an electronic control unit.

11. A system for optimising energy usage at a hammering drilling arrangement, the system comprising:

a sensing arrangement for determining an acceleration of a drilling head in the drilling arrangement at least in the drilling direction; and a control unit configured to:
determine a main drilling frequency in the drilling direction based on the determined acceleration,
integrate said main drilling frequency over time;
determine an amplitude of the acceleration at least at the main drilling frequency;
determine a parameter related to the energy usage at the drilling arrangement based on said integration and said determined amplitude of the acceleration at least at the main drilling frequency; and
optimise the energy usage based on an optimisation of the value of the determined parameter.

12. The system according to claim 11, further comprising a presenting arrangement for presenting said determined parameter to an operator of the drilling arrangement.

* * * * *